(12) United States Patent
Luo

(10) Patent No.: US 11,758,922 B2
(45) Date of Patent: Sep. 19, 2023

(54) METHODS FOR EXTRACTING MILK PROTEIN FROM EXPIRED OR SPOILED MILK

(71) Applicant: Mi Terro Inc., City of Industry, CA (US)

(72) Inventor: Yi Luo, Walnut, CA (US)

(73) Assignee: Mi Terro Inc., City of Industry, CA (US)

( * ) Notice: Subject to any disclaimer, the term of this patent is extended or adjusted under 35 U.S.C. 154(b) by 136 days.

(21) Appl. No.: 17/188,052

(22) Filed: Mar. 1, 2021

(65) Prior Publication Data

US 2022/0095645 A1 Mar. 31, 2022

(30) Foreign Application Priority Data

Sep. 28, 2020 (CN) .............................. 202011038523

(51) Int. Cl.
| | |
|---|---|
| *A23J 1/20* | (2006.01) |
| *A23J 3/08* | (2006.01) |
| *A23C 7/00* | (2006.01) |
| *A23C 7/04* | (2006.01) |

(52) U.S. Cl.
CPC . *A23J 1/20* (2013.01); *A23J 3/08* (2013.01); *A23C 7/00* (2013.01); *A23C 7/04* (2013.01)

(58) Field of Classification Search
CPC ...... A23J 1/20; A23J 3/08; A23C 7/00; A23C 7/04
USPC ......................................... 426/656, 657, 580
See application file for complete search history.

(56) References Cited

U.S. PATENT DOCUMENTS

| | | | | |
|---|---|---|---|---|
| 4,665,158 A | * | 5/1987 | Armanet | A23J 3/32 530/370 |
| 6,465,209 B1 | * | 10/2002 | Blinkovsky | A23J 3/34 435/68.1 |

FOREIGN PATENT DOCUMENTS

CN 109776666 A 5/2019

* cited by examiner

*Primary Examiner* — Leslie A Wong
(74) *Attorney, Agent, or Firm* — ENTRALTA P.C.; James F. Fleming; Peter D. Weinstein

(57) ABSTRACT

Methods for extracting protein from expired or spoiled milk is disclosed. In at least one embodiment, the method includes the steps of acid hydrolysis, first filtration, fine filtration, activation, salting out, degreasing, drying and packaging. Through the combined process of "protein activation" and "self-assembly salting out," these methods enable the reuse and upcycling of expired and spoiled milk.

16 Claims, 1 Drawing Sheet

METHODS FOR EXTRACTING MILK PROTEIN FROM EXPIRED OR SPOILED MILK

RELATED APPLICATIONS

This application claims priority and is entitled to the filing date of China application serial number CN 202011038523.7, filed on Sep. 28, 2020. The contents of the aforementioned application are incorporated herein by reference.

BACKGROUND

The subject of this patent application relates generally to the technical field of biological protein extraction and purification, and more particularly to methods for extracting milk protein from expired or spoiled milk.

Applicant hereby incorporates herein by reference any and all patents and published patent applications cited or referred to in this application.

By way of background, milk is an indispensable nutrient in people's daily life and has rich nutritional value. Every 100 g of milk contains an average of 3.0 g of protein, 3.2 g of fat, 3.4 g of carbohydrate, 1 mg of vitamin C, 0.21 mg of vitamin E, and 104 mg of calcium, 73 mg of phosphorus. These rich nutrients make milk a natural culture medium, which can easily breed bacteria and deteriorate its edible value. According to statistics, the global loss of dairy products due to expiration and deterioration is about 1.28 million tons per year, causing a lot of waste of dairy resources. The use of waste milk to extract milk protein for recycling is the main way to solve the waste of dairy products, which has important economic value and practical significance.

The application number CN 201910118089.4 has reported the technology of extracting milk protein from normal milk, but the technology of extracting milk protein using expired and spoiled milk as raw material has not been reported. This also illustrates the level of difficulty on extracting milk protein from waste milk. Differ from normal milk, expired and spoiled milk is spoiled due to bacterial growth and microbial decomposition, accompanied by sour smell, mildew, and even cheese agglomeration. The reported technology cannot be used to purify milk protein. At the same time, the decomposition of bacteria reduces the molecular weight of milk protein to form small molecular proteins, which increases the difficulty of extraction. In addition, the metabolites of bacteria pose challenges for purification.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The purpose of the presented invention is to provide a method for extracting milk protein from expired or spoiled milk, so as to solve the waste of resources caused by the unusable wasted milk.

The presented invention achieves the above objectives through the following technical solutions: A method for extracting milk protein from expired or spoiled milk, the steps include: (1) Pretreatment: Mix and stir expired or spoiled milk with acid solution, sterilize, deodorize and dissociate protein after acid hydrolysis treatment, and then coarse filter the acid hydrolysis milk to remove bacteria and impurities to obtain the stock solution to be purified; (2) Degreasing and purification: the stock solution to be purified is subjected to fine filtration to remove hyphae, denatured proteins and solid jelly. Transfer the filtrate to a container, add sodium hydroxide solution to pH 7-9, and then add an activator for protein activation. Then, the dilute acid solution is added dropwise to make the dissociated protein self-assemble and salt out to obtain regenerated milk protein. The regenerated milk protein is defatted with a degreasing agent, and then washed and filtered to obtain skim milk protein; (3) Post-processing: dry the skim milk protein to complete the extraction.

A further improvement is that the expired or spoiled milk is selected from expired milk, spoiled milk, expired milk powder, expired cheese or expired yogurt. Preferably expired milk.

A further improvement is that the acid hydrolysis solution uses one of hydrochloric acid, sulfuric acid or acetic acid with a mass percentage concentration of 1-10%, preferably hydrochloric acid, and the expired or deteriorated milk and the acid hydrolysis solution are in accordance with 2:1-5: The mass ratio of 1 is mixed.

A further improvement is that the stirring at a constant temperature of 25-60° C. for 20-60 minutes and mixing method of the expired or spoiled milk and the acid solution.

A further improvement is that the mass percentage concentration of the sodium hydroxide solution is 1-18%, and the weak alkaline refers to a pH of 7-9.

A further improvement is that the mass percentage concentration of the dilute acid solution is 0.5-2%, and the salt concentration of the obtained regenerated milk protein is 1.2-2 mol/L.

A further improvement is that the activator is urea or guanidine hydrochloride, preferably urea, and the addition amount of the activator is 0.02-0.5% of the total mass of the solution, the protein activation temperature is 25-35° C., and the activation time is 10-30 minute.

A further improvement is that the degreasing agent is one of sodium dodecylbenzene sulfonate, sodium lauryl sulfate, diethyl ether or petroleum ether, preferably sodium lauryl sulfate, and the amount of degreasing agent added is the total mass of the solution 0.1-0.3% of the content, the degreasing conditions are 30-50° C., 300-500 RPM stirring for 10-60 minutes.

A further improvement is that the drying treatment adopts freeze drying or spray drying, preferably freeze drying.

A further improvement is that the specific operation of the freeze-drying is to freeze and agglomerate skimmed milk protein at −18° C. to −10° C., and then put it in a freeze dryer to dry for 24-96 hours.

The invention restores the activity of expired or spoiled milk through pretreatment, acidolysis, and activation processes, which facilitates the regeneration of milk proteins in subsequent processes, and obtains regenerated milk extracted from expired or spoiled milk through processes such as degreasing, purification, washing, and drying protein.

The beneficial effects of the present invention are: (1) Through the combined process of "protein activation" and "self-assembly complex salting-out", the present invention successfully realizes the technology of extracting milk protein from discarded expired or spoiled milk and solves the wasted milk issue. The rational and effective recycling and utilization of resources; (2) The method has the characteristics of high efficiency, strong operability and no pollution, simple technical operation, short process flow, and strong industrialization operability.

Thus, in order to solve the problem of wasted milk resources, the present invention develops "protein activation" and "self-assembly complex salting-out" technologies in view of the characteristics of expired and spoiled milk protein and the technical difficulties of extraction and purification to realize the recovery of milk protein in waste milk. The technology has the characteristics of high efficiency, strong operability and pollution-free, and provides a new method and technical path for recycling and repurposing dairy waste.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
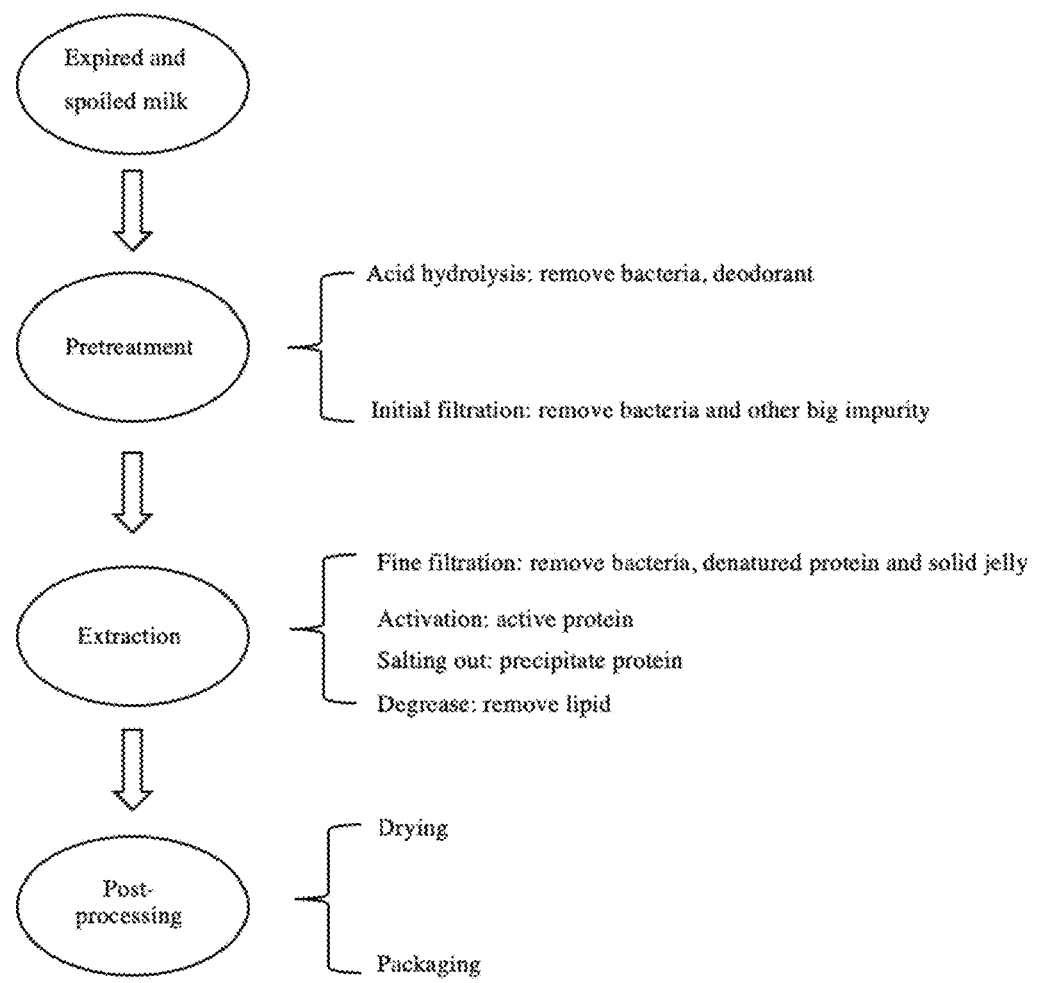
FIG. 1 is a flow diagram of an exemplary method for extracting milk protein from expired or spoiled milk, in accordance with at least one embodiment.
Figure 2:
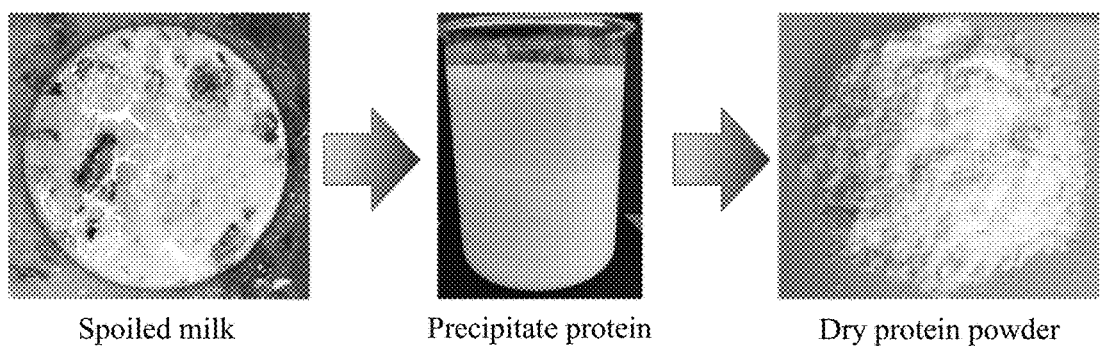
FIG. 2 is a diagram showing the appearance of milk protein extracted from expired or spoiled milk, in accordance with at least one embodiment.

Turning now to FIG. 1, there is shown a flow diagram of an exemplary method for extracting milk protein from expired or spoiled milk, in accordance with at least one embodiment. The presented invention uses 950 ml carton packs of expired spoiled milk as the raw material. Refer to FIGS. 1 and 2 to develop examples. The specific technical operation steps and test results are shown in Examples 1-3:

Example 1

A method for extracting milk protein from expired spoiled milk, the steps include: (1) Pre-treatment: Take 950 ml of expired and spoiled milk and place it in a 2000 ml beaker, add a 1% HCl solution with a mass percentage concentration of 5:1 and mix and stir at 25° C. for 20 minutes, and then use a single layer of gauze to perform coarse filtration to remove moldy colonies, mildew spots, plaques and impurities to obtain a stock solution to be purified; (2) Degreasing and purification: the stock solution to be purified is finely filtered with a filter cloth to remove hyphae, denatured proteins and solid impurities, and 1% by mass sodium hydroxide solution is added to the finely filtered milk to pH. Then, add the activator urea, and the added amount accounts for 0.03% of the mass percentage in the solution, and activate at 25° C. for 10 min. After activation, use 1% dilute hydrochloric acid for back titration to the salt concentration of the system is 2 mol/L, the milk protein is self-assembled and complexed to separate out, then 0.1% of the total mass of the solution is added with sodium dodecylbenzene sulfonate, and stirred at 30° C., 300 RPM for 60 minutes, After finishing skimming, washing and filtering, repeat 2-3 times to get skimmed milk protein; (3) Post-processing: freeze the skim milk protein at −16° C. to agglomerate, and then dry it in a freeze dryer for 24 hours to obtain regenerated skim milk protein. Finally, encapsulate and calculate the extraction rate of the milk protein by mass method to 1.9%.

Example 2

A method for extracting milk protein from expired or spoiled milk, the steps include: (1) Pre-treatment: Take 950 ml of expired and spoiled milk and place it in a 2000 ml beaker, add sulfuric acid with a mass percentage of 5% and mix and stir according to a mass ratio of 4:1, and keep the temperature at 40° C. for 40 minutes, and then use a single layer of gauze to perform coarse filtration to remove moldy colonies, mildew spots, plaques and impurities to obtain a stock solution to be purified; (2) Degreasing and purification: the stock solution to be purified is finely filtered with a filter cloth to remove hyphae, denatured proteins and solid impurities, and a 5% by mass sodium hydroxide solution is added to the finely filtered milk to pH. Then, add the activator urea, and the added amount accounts for 0.5% of the mass percentage in the solution, and activate it at 30° C. for 20 minutes. After activation, use 0.5% dilute hydrochloric acid for back titration to The salt concentration of the system is 1.5 mol/L, so that the milk protein self-assembles and complexes and precipitates, and then add the degreasing agent sodium lauryl sulfate with a concentration of 0.2% in the solution, and the temperature is 40° C., 400 RPM Stir for 40 minutes, then wash and filter, repeat 2-3 times to obtain skim milk protein; (3) Post-processing: freeze agglomerates of skim milk protein at −10° C., and then dry it in a freeze dryer for 48 hours to obtain regenerated skim milk protein. Finally, encapsulate and calculate the extraction rate of the milk protein by mass method to 2.2%.

Example 3

A method for extracting milk protein from expired or spoiled milk, the steps include: (1) Pre-treatment: Take 950 ml of expired and spoiled milk and place it in a 2000 ml beaker, add acetic acid with a mass percentage of 10% in a mass ratio of 2:1, mix and stir, and stir at a constant temperature of 60° C. After 60 minutes, use a single layer of gauze to perform coarse filtration to remove moldy colonies, mildew spots, plaques and impurities, and obtain the milk stock solution to be purified; (2) Degreasing and purification: the stock solution to be purified is finely filtered with a filter cloth to remove hyphae, denatured proteins and solid impurities, and 18% by mass sodium hydroxide solution is added to the finely filtered milk until the pH is 8. Then add the activator guanidine hydrochloride, and the added amount accounts for 0.02% of the mass percentage in the solution and activate it at 35° C. for 30 minutes. After activation, use dilute 2% hydrochloric acid to titrate to the salt concentration of the system is 1.2 mol/L to make the milk protein self-assembled and complexed to separate out, then add the degreaser ether with a concentration of 0.3% in the solution, and stir for 10 minutes at 50° C., 500 RPM, and then wash and filter, repeat 2-3 times to get skimmed milk protein; (3) Post-processing: freeze the skim milk protein to agglomerate at −18° C., and then dry it in a freeze dryer for 96 hours to obtain regenerated skim milk protein. Finally, it is encapsulated and calculated by the mass method to obtain an extraction rate of 1.6% of the milk protein.

The above-mentioned embodiments only express several embodiments of the present invention, and the descriptions are relatively specific and detailed, but they should not be interpreted as limiting the scope of the present invention. It should be pointed out that for those of ordinary skill in the art, without departing from the concept of the present invention, several modifications and improvements can be made, and these all fall within the protection scope of the presented invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the methods and the order in which the respective elements of each method are performed are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for extracting protein from milk comprising the steps of:
    a) mixing the milk with a 1-10% acid solution to a mass ratio of 2:1 to 5:1, thereby forming a milk solution; sterilizing, deodorizing and dissociating protein;
    b) coarse filtering the milk solution through a single layer of gauze to remove bacteria and impurities to obtain a stock solution;
    c) filtering the stock solution with a filter cloth to remove hyphae, denatured proteins and solid jelly to obtain a filtered stock solution;
    d) transferring the filtered stock solution to a container;
    e) adding a sodium hydroxide solution to the filtered stock solution to reach a pH of between 7 and 9;
    f) adding an activator to the filtered stock solution for protein activation;
    g) adding a dilute acid solution dropwise to the filtered stock solution, thereby causing the dissociated protein to self-assemble, complex and salt out to obtain a regenerated milk protein;
    h) defatting the regenerated milk protein with a degreasing agent;
    i) washing and filtering the milk protein to obtain a skim milk protein; and
    j) drying the skim milk protein.

2. The method of claim 1, wherein the milk is selected from expired milk, spoiled milk, expired milk powder, expired cheese, and expired yogurt.

3. The method of claim 1, wherein the acid solution is selected from hydrochloric acid, sulfuric acid or acetic acid.

4. The method of claim 1, wherein the 1-10% acid solution is added to the milk to reach a mass ratio of 2:1-5:1.

5. The method of claim 1, wherein the step of mixing the milk with a 1-10% acid solution further comprises a step of stirring the milk at a temperature of 25-60° C. for 20-60 minutes.

6. The method of claim 1, wherein the sodium hydroxide solution has a mass percentage of concentration of 1-18%.

7. The method of claim 1, wherein the dilute acid solution has a mass percentage of concentration of 0.5-2%.

8. The method of claim 7, wherein the regenerated milk protein has a salt concentration of 1.2-2 mol/L.

9. The method of claim 1, wherein the activator is selected from urea and guanidine hydrochloride.

10. The method of claim 1, wherein the activator is added to reach an amount that is 0.02-0.5% of a total mass of the filtered stock solution.

11. The method of claim 1, wherein the activator is added to the filtered stock solution at a temperature of 25-35° C. for 10-30 minutes.

12. The method of claim 1, wherein the degreasing agent is selected from dodecylbenzene sulfonate, sodium, sodium lauryl sulfate, ether, and petroleum ether.

13. The method of claim 1, wherein the degreasing agent is added in an amount that is 0.1-0.3% of a total mass of the filtered stock solution.

14. The method of claim 1, wherein the degreasing agent is added to the filtered stock solution at a temperature of 30-50° C., while stirring at 300-500 RPM for 10-60 minutes.

15. The method of claim 1, wherein a freeze drying technique or a spray drying technique is used in the step of drying the skim milk protein.

16. The method of claim 1, wherein the step of drying the skim milk protein comprises steps of freeze drying the skim milk protein at a temperature of −18~−10° C. and placing the skim milk protein into a freeze dryer for 24-96 hours.

* * * * *